United States Patent
Galatzer et al.

(10) Patent No.: US 11,475,081 B2
(45) Date of Patent: Oct. 18, 2022

(54) COMBINING CATALOG SEARCH RESULTS FROM MULTIPLE PACKAGE REPOSITORIES

(71) Applicant: Microsoft Technology Licensing, LLC, Redmond, WA (US)

(72) Inventors: Yishai Galatzer, Redmond, WA (US); John A. Taylor, Bellevue, WA (US); Alexandre Panov, Duvall, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 519 days.

(21) Appl. No.: 15/295,693

(22) Filed: Oct. 17, 2016

(65) Prior Publication Data

US 2018/0107740 A1    Apr. 19, 2018

(51) Int. Cl.
*G06F 16/9535*    (2019.01)
*G06F 8/60*    (2018.01)
*G06F 16/248*    (2019.01)
*G06F 16/2457*    (2019.01)

(52) U.S. Cl.
CPC ............ *G06F 16/9535* (2019.01); *G06F 8/60* (2013.01); *G06F 16/248* (2019.01); *G06F 16/24578* (2019.01)

(58) Field of Classification Search
CPC .......... G06F 16/9535; G06F 16/24578; G06F 16/248; G06F 8/60
See application file for complete search history.

(56) References Cited

U.S. PATENT DOCUMENTS

| | | | |
|---|---|---|---|
| 7,209,915 B1 * | 4/2007 | Taboada | G06F 16/951 707/755 |
| 8,122,017 B1 | 2/2012 | Sung et al. | |
| 8,719,805 B2 | 5/2014 | Zhao | |

(Continued)

FOREIGN PATENT DOCUMENTS

| | | |
|---|---|---|
| CN | 102129381 A | 7/2011 |
| WO | 2006034258 A1 | 3/2006 |
| WO | 2013158758 A1 | 10/2013 |

OTHER PUBLICATIONS

"Managing Packages Using the Package Manager Console", Published on: Mar. 1, 2015 Available at: https://docs.nuget.org/consume/package-manager-console.

(Continued)

*Primary Examiner* — Vaishali Shah
(74) *Attorney, Agent, or Firm* — Fiala & Weaver P.L.L.C.

(57) ABSTRACT

Methods, systems, apparatuses, and computer program products are provided for merging the query results received for a query provided to multiple services. In one aspect, a query is transmitted to a plurality of search services. A plurality of query result sets is received from the search services in response to the query. A comparer function is generated by applying a ranking algorithm to the received query result sets that orders the query results of the query result sets without regard to a received order of the query results in the query result sets. The query result sets are merged into a merged query result set using the comparer function. In an aspect, the query result sets are merged in a manner that maintains an internal order of each received query result set in the merged query result set.

20 Claims, 5 Drawing Sheets

(56) References Cited

U.S. PATENT DOCUMENTS

| | | |
|---|---|---|
| 8,893,114 B1 | 11/2014 | Cooley |
| 9,003,400 B2 | 4/2015 | Antill et al. |
| 9,052,979 B2 | 6/2015 | Balasubramanian et al. |
| 9,256,422 B2* | 2/2016 | Grechanik ............... G06F 8/70 |
| 2002/0147724 A1* | 10/2002 | Fries ................... G06F 16/951 |
| 2006/0074884 A1* | 4/2006 | Sawashima ........... G06F 16/951 |
| 2007/0185863 A1* | 8/2007 | Budzik ................. G06F 16/242 |
| 2008/0072180 A1* | 3/2008 | Chevalier ............. G06F 3/0481 |
| | | 715/861 |
| 2008/0271001 A1* | 10/2008 | Nonomura ............ G06F 21/125 |
| | | 717/143 |
| 2010/0131517 A1 | 5/2010 | Huang et al. |
| 2013/0117312 A1* | 5/2013 | Chen ....................... H04L 67/26 |
| | | 707/780 |
| 2013/0138635 A1* | 5/2013 | Park ..................... G06F 16/245 |
| | | 707/723 |
| 2013/0325836 A1* | 12/2013 | Gerwe .................. G06F 16/338 |
| | | 707/706 |
| 2014/0304247 A1* | 10/2014 | Fastlicht ................. G06F 16/40 |
| | | 707/706 |
| 2016/0162583 A1* | 6/2016 | Maddocks .......... G06F 16/9535 |
| | | 707/722 |
| 2017/0109609 A1* | 4/2017 | Hill ........................ G06Q 30/00 |

OTHER PUBLICATIONS

Gray, Simon, "How to install ANYTHING in Ubuntu", Published on: Oct. 15, 2011 Available at http://arvutiring.rvg.edu.ee/lisad/kuidas_tarkvara_ubuntule_paigaldada/.

"Installing Software", Published on: Nov. 10, 2015 Available at: http://opensuse-guide.org/installpackage.php.

Cassidy, Steve, "Defining a Web Services Interface for a Software Package Repository", Published on: Sep. 2, 2003 Available at: http://ausweb.scu.edu.au/aw03/papers/cassidy/paper.html.

* cited by examiner

502

Merge the query result sets into a merged query result set according to the comparer function in a manner that maintains an internal order of each received query result set of the plurality of query result sets in the merged query result set

Generate an intermediate comparer function based on a subset of the plurality of query result sets received from the search services while waiting for a remainder of the plurality of query result sets to be received

604

Generate an intermediate merged query result set by merging the subset of the query result sets using the intermediate comparer function

FIG. 6

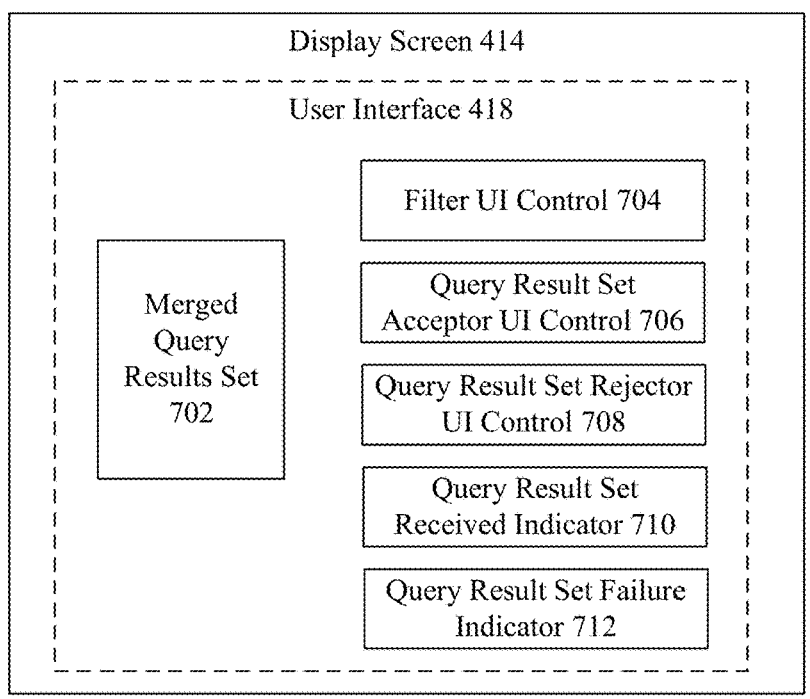

FIG. 7

COMBINING CATALOG SEARCH RESULTS FROM MULTIPLE PACKAGE REPOSITORIES

BACKGROUND

Various types of software development tools or applications exist that software developers may use to develop software. An integrated development environment (IDE) is a type of software development application that contains several development tools in one package. An IDE may include tools such as a source code editor ("code editor"), a build automation tool, and a debugger. Examples of IDEs include Eclipse™ developed by Eclipse Foundation of Ottawa, Canada, ActiveState Komodo™ developed by ActiveState of Vancouver, Canada, IntelliJ IDEA developed by JetBrains of the Czech Republic, Oracle JDeveloper™ developed by Oracle Corporation of Redwood City, Calif., NetBeans developed by Oracle Corporation, Codenvy™ developed by Codenvy of San Francisco, Calif., Xcode® developed by Apple Corporation of Cupertino, Calif., and Microsoft® Visual Studio®, developed by Microsoft Corporation of Redmond, Wash.

Modern software development depends heavily on using software packages that contain code libraries and additional development tools. Typically, these software packages may be obtained from online repositories. An online repository may provide catalog services that include a search function to allow a user to discover software packages available at the repository. Advanced software development environments integrate the discovery and installation of software packages as an aspect of the user interface. Advanced software development applications may integrate multiple mutually independent package repositories. For instance, the user of the development application may interface with multiple package repositories, sending a search request for a software package to each configured package repository. The query results received from each repository may be displayed to the user so that the user can select a software package for use.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for merging the query results received for a query provided to multiple services. In one aspect, a query is transmitted to a plurality of search services. A plurality of query result sets is received from the search services in response to the query. A comparer function is generated by applying a ranking algorithm to the received query result sets that orders the query results of the query result sets without regard to a received order of the query results in the query result sets. The query result sets are merged into a merged query result set using the comparer function. In an aspect, the query result sets are merged in a manner that maintains an internal order of each received query result set in the merged query result set Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 5 shows a process for merging query results, according to an example embodiment.

FIG. 6 shows a flowchart providing a process for generating an intermediate merged query result set based on receiving query results from a subset of the queried services, according to an example embodiment.

FIG. 7 shows a block diagram of a user interface configured to display and filter merged query results, according to an example embodiment.

Figure 1:
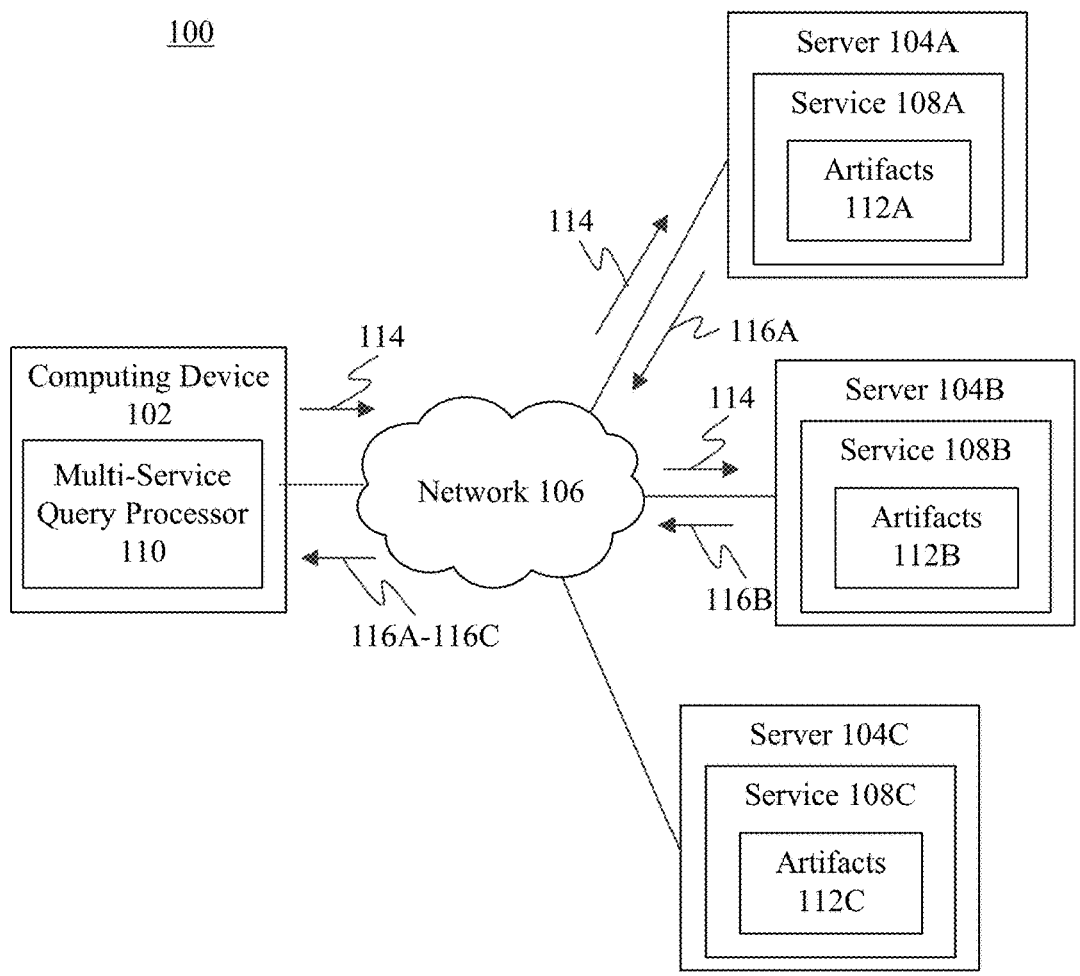
FIG. 1 shows a block diagram of a search aggregation system that contains a computing device containing a multi-service query processor configured to provide a query request to multiple services, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Merging Query Results from Multiple Services

A network-based search for information may be performed by a client issuing a query to a particular service endpoint at a server. The result of the query is the most relevant list of artifacts (also referred to as "data items," "items," "data objects," "objects," etc.) as determined by that particular service. Each service maintains its own collection or catalog of artifacts, which may be the same as or different than the collection maintained by other services. Each service determines relevance of artifacts based on a relevance determining algorithm implemented by the service, which may be the same or different than implemented by other services.

In one example of determining relevance, a service may have tokenized the descriptive information it holds with regard to the artifacts in its catalog, may maintain statistical knowledge of its catalog, and when receiving a query, may calculate the best match for the query based on relevance, with reference to the internal knowledge it maintains of its catalog. This catalog may comprise many hundreds of thousands if not millions of items, each with their own individual descriptive information ("attributes"). In summary, relevance is typically determined based on internal knowledge a service maintains. It may be impractical for the server to be able to externalize this knowledge to other entities.

It is informative to look briefly at how a typical service processes a query request. A typical process for a service to process a query request is described as follows. An exemplary service may maintain sixteen documents as artifacts in its catalog, shown as Table 1 as documents:

TABLE 1

| Doc 101 |
| Doc 102 |
| Doc 103 |
| Doc 104 |
| Doc 105 |
| Doc 106 |
| Doc 107 |
| Doc 108 |
| Doc 109 |
| Doc 110 |
| Doc 111 |
| Doc 112 |
| Doc 113 |
| Doc 114 |
| Doc 115 |
| Doc 116 |

An aim of the query processing process at the service is to present the user with a small set of documents, with each document in the result set being a reasonable match for the query. Furthermore, an aim of the query handling process is to order the result set such that the "best" (most relevant) document appears at the top of the list, and the remaining documents are listed in order of declining relevance.

A set of "All Documents" at a service might number in the thousands if not millions. As such, the initial phase of the query processing is configured to reduce the result set of documents down to just those that match the query, such as by performing a Boolean logic-based match. For example, according to one technique, if the query contains a particular term (following a process of tokenization of the query, where the query text is broken into separate words or phrases referred to as "tokens") and a document also contains that particular term (following a similar process of tokenization of documents in the catalog) then that document can be said to "match" that query. A query and each document may yield any number of possible terms/tokens, and thus many documents, including hundreds or thousands of documents, may actually match the query.

With reference to the above example list of documents, the following documents may have been determined by the service to match the received query, shown as Table 2

TABLE 2

| Doc 101 |
| Doc 104 |
| Doc 105 |
| Doc 108 |
| Doc 110 |
| Doc 114 |
| Doc 116 |

A next phase of query processing is to score the matching documents such that those that are a better match are ranked higher than others. A typical implementation may compute this "better match" according to a relevance algorithm, which may be a statistical calculation that considers the number of matching terms in a particular document set against the count of those terms in the population of all documents. The calculation is domain specific in the sense that some fields of the document may have more influence than others. For example, a matching term in a title field may score higher than the same matching term in a description field. Other factors are frequently used to add weight to a particular score. For instance, a service may also gather statistics with respect to the recent popularity of particular artifacts, and may use those statistics to act as a tie breaker between documents that would have otherwise had the same score.

With reference to the above example list of matching documents, the matching documents may have been ranked by relevance as shown in Table 3 below:

TABLE 3

Doc 110
Doc 114
Doc 105
Doc 108
Doc 101
Doc 104
Doc 116

In a next phase, the service, having ranked all the possible matches, takes a top subset of the ranked documents and returns them to the client as the query result set. With reference to the above ranking of documents, the four top most relevant documents are shown in Table 4 below:

TABLE 4

Doc 110
Doc 114
Doc 105
Doc 108

In this example scenario, these top four most relevant document may be provided to the requestor as the query result set of most relevant documents matching the query for the service.

This is a typical query processing process provided for illustrative purposes, though other query handling processes may be implemented by services to determine matching artifacts in a large initial artifact set, and determine the most relevant, most appropriate, result for a particular query. Some query processing processes may be more or less sophisticated. Invariably, query processing is performed internal to the particular service, and for practical reasons, a service's query processing process is not generally shared directly with the client.

As such, from the client's perspective, the service responds to the query with an ordered result the service determines to be the best match according to its internal knowledge. A service's knowledge may include knowledge of its overall population of artifacts, as well as other knowledge, such as the popularity it has observed of a particular artifact.

In another scenario, a client may issue a query to multiple services operating at multiple servers. In such case, each service (also called "repository") may contain its own catalog of artifacts in any number. The client is able to search and browse different catalogs by selecting between various services. Often the catalogs cannot be combined under a single service for various reasons. On some occasions it is impractical from a logistical point of view to combine all the catalogs. On other occasions, more fundamental concerns exist such as privacy.

If a client wants to discover artifacts maintained by a service at a server, the client sends the query to the service. In order for a user to fully search the repositories maintained at multiple services, the user has to explicitly switch directing the search query from one service to the next service, until the query is made to each service. This is laborious, potentially error prone, and can easily lead to an artifact being missed due to mistakes in the manual process of switching between services. This process is also inefficient and time consuming because of the sequential nature of the efforts performed by the user.

In embodiments described herein, a client is enabled to send their query to all services in a single operation at the same time. However, multiple query result sets have to be presented to the user. According to a first approach, the query result sets are displayed alongside each other. In such case, however, the user still has to scan across multiple result sets presented on the screen. This may not be unreasonable for small numbers of result sets (e.g., 2 or 3), but can become unmanageable with further numbers of services involved. Not only is the cognitive load on the user significant, but screen real estate becomes an issue.

According to embodiments, all of the query result sets received from the services are aggregated into a single result set presented to the user. This is immediately a more understandable user experience: the user typed in one query and sees one result. The fact that the client happened to communicate with multiple servers to get that result is a secondary consideration in the user experience.

Merging the multiple ordered results into a single ordered result is difficult. The individual result sets are determined according to knowledge held internally in each server and not available to the client. That is, each result set contains artifacts listed in decreasing order of relevance, each according to the relevance determination made at the corresponding service. Thus, a determination must be made at the client of how to order the results when all the query result sets are merged.

In the merged results, a user may desire for the document ordering received from each server to not change. In other words, if service A provides the ranked query result set of documents [A104, A108, A124], it may be desired that the merged result set contains documents A104, A108, and A124 in this order, even though documents A104, A108, and A124 may be interleaved with other documents in the merged result set. One reason may be that the user might may desire to switch backwards and forwards between a multiple-service aggregated view (merged) and a single service view of the query results. If the order of the documents from service A changes in the viewed document list depending on the particular view type, this may be disconcerting to the user. In an embodiment, the merged query results show all the results in a single ordered list, while respecting the individual ordering of documents received from a particular service.

For example, consider a scenario with first and second services A and B producing the ranked query result sets of [A104, A108, A124] and [B105, B107, B109], respectfully. When these results are merged, the overall merged ordering might look like this [A104, B105, B107, A108, B109, A124], which maintains the original orderings received from services A and B. However, if the merged ordering was generated as [A104, B107, B105, A108, B109, A124], where B105 and B107 have swapped their original ordering, this may be a problem to the user, where if the user switched to a view of just the ranked query result set from service B, the query result set of service B would appear to change order according to whether service A is also viewed or not.

Accordingly, embodiments enable a query to be provided to multiple services at the same time, and enable the merging of the query result sets received in response to the query from the multiple services. Embodiments enable the query result sets from the individual services to be merged even where there is no global shared knowledge of the overall population of artifacts across all of the services. Furthermore, embodiments enable the query result sets to be merged without changing the received rank orders of the query result sets established at the multiple services.

Embodiments may be implemented in various ways. For instance, FIG. 1 shows a block diagram of a query processing system 100, according to an example embodiment. As shown in FIG. 1, system 100 includes a computing device 102 and first-third servers 104A-104C. Computing device 102 and first-third servers 104A-104C are communicatively coupled by a network 106. Computing device 102 includes a multi-service query processor 110. Server 104A includes a service 108A that maintains artifacts 112A, server 104B includes a service 108B that maintains artifacts 112B, and server 104C includes a service 108C that maintains artifacts 112C. Services 108A-108C each provide a catalog service that enables searching of their respective sets of artifacts. These features of system 100 are further described as follows.

Computing device 102 and servers 104A-104C may each be one or more of any type of stationary or mobile computing device(s), including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer, PC (personal computer), data server, etc.

Computing device 102 and servers 104A-104C are communicatively coupled by network 106. Network 106 may include one or more communication links and/or communication networks, such as a PAN (personal area network), a LAN (local area network), a WAN (wide area network), or a combination of networks, such as the Internet. Computing device 102 and servers 104A-104C may each be communicatively coupled to network 106 using various links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc. Although three services 108A-108C and corresponding servers 104A-108C are shown in FIG. 1, any number of services and servers may be present in system 100, including tens of services/servers, hundreds of services/servers, and greater or lesser numbers of services/servers.

Multi-service query processor 110 is configured to provide queries to services such as services 108A-108C at servers 104A-104C. Services 108A-108C each maintain (e.g., store and organize) artifacts 112A-112C, respectively, at servers 104A-104C. Artifacts 112A-112C each include a collection (e.g., a catalog, a database, a list, etc.) of data objects, data items, etc., such as files, documents, etc. Services 108A-108C are each enabled to process a query directed at their artifacts, such as by determining artifacts that match the query (e.g., as described elsewhere herein), ranking the matching artifacts (according to one or more ranking/relevance algorithms maintained by the service), and providing an indication of the ranked matching artifacts to the query provider, which may include just a list, links, or other indications of the ranked matching artifacts and/or may include actual copies of the ranked matching artifacts.

Multi-service query processor 110 may be stand-alone or may be implemented in any type of tool configured to source queries, and may be configured to source queries for any type/kind of artifacts. Furthermore, services 108A-108C may each be any type of service that maintains any type of artifacts.

Figure 2:
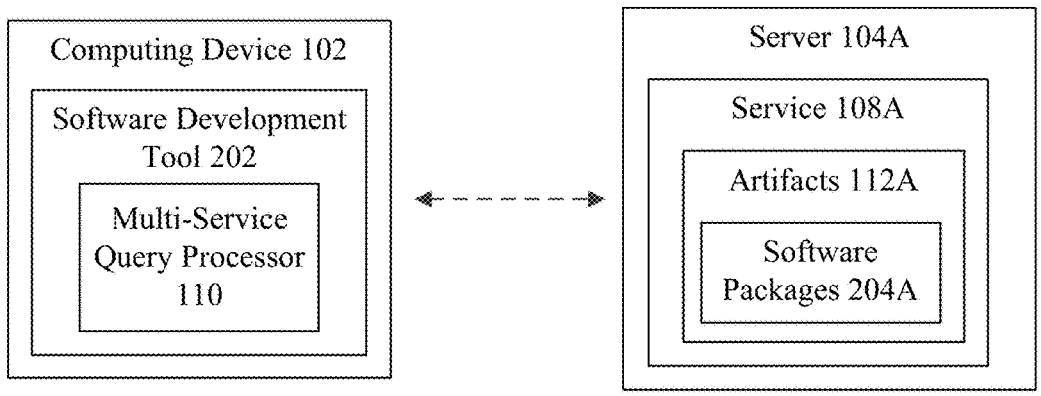
FIG. 2 shows a block diagram of a software development tool containing a multi-service query processor that requests software packages from remote services, according to an example embodiment.

For example, FIG. 2 shows a block diagram of a software development tool 202 that contains multi-service query processor 110, according to an example embodiment. In an embodiment, software development tool 202 uses multi-service query processor 110 to query for resources, such as software packages. Modern software development frequently relies on using software packages that contain code libraries (code organized in such a way that it can be used by multiple programs that have no connection to each other, rather than being part of a program and only for that program's use) and additional development tools (e.g., debuggers, code visualizers, code editors, compilers, etc.). In an embodiment, artifacts 112A-112C at services 108A-108C include software packages, which may include code libraries, development tools, etc. Accordingly, multi-service query processor 110 enables software development tool 202 to search for software packages at services 108A-108C by enabling a query for software packages to be issued to the services, which each respond with a ranking of the software packages maintained at the service that match the query. Typically, these software packages may be obtained from online repositories. An online repository may provide catalog services such as a search function that will allow a user to discover software packages available at the repository.

Software development tool 202 may include any type of one or more software development tools, including stand-alone tools or integrated development environments, such as Eclipse™, ActiveState Komodo™, IntelliJ IDEA, Oracle JDeveloper™ NetBeans, Codenvy™, Xcode®, Microsoft® Visual Studio®, etc.

Figure 3:
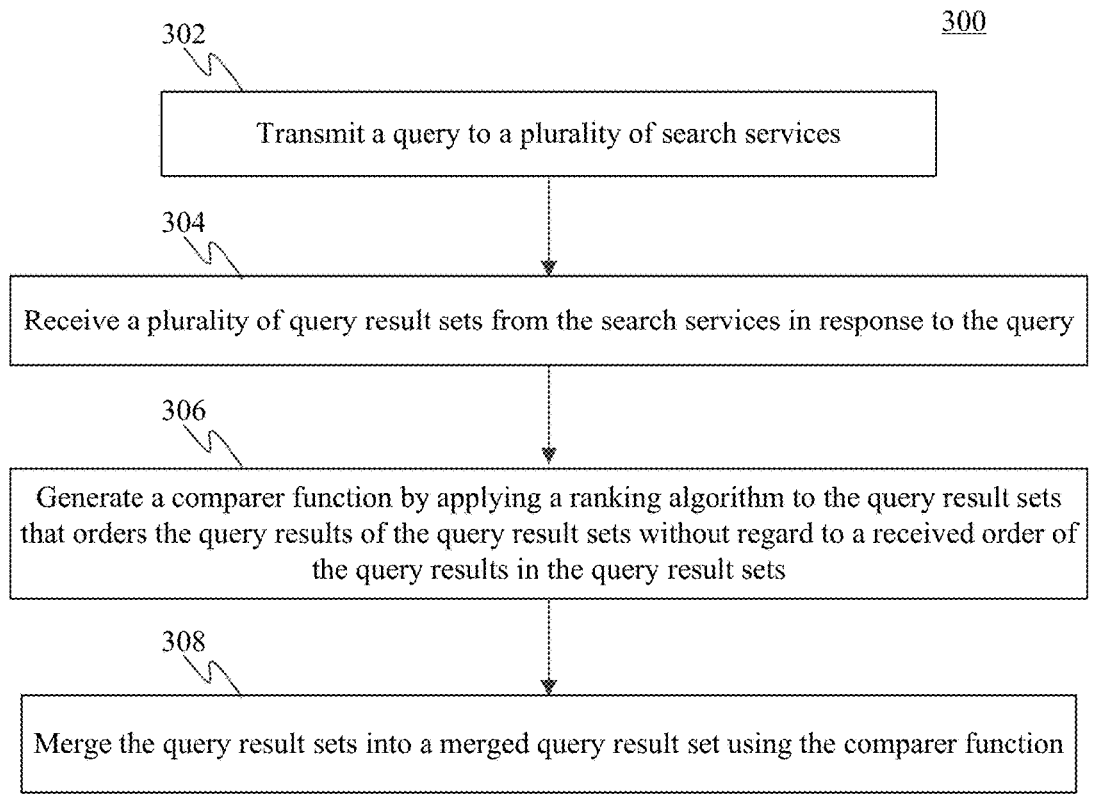
FIG. 3 shows a flowchart providing a process for providing a query request to multiple services and merging the query results, according to an example embodiment.
Figure 4:
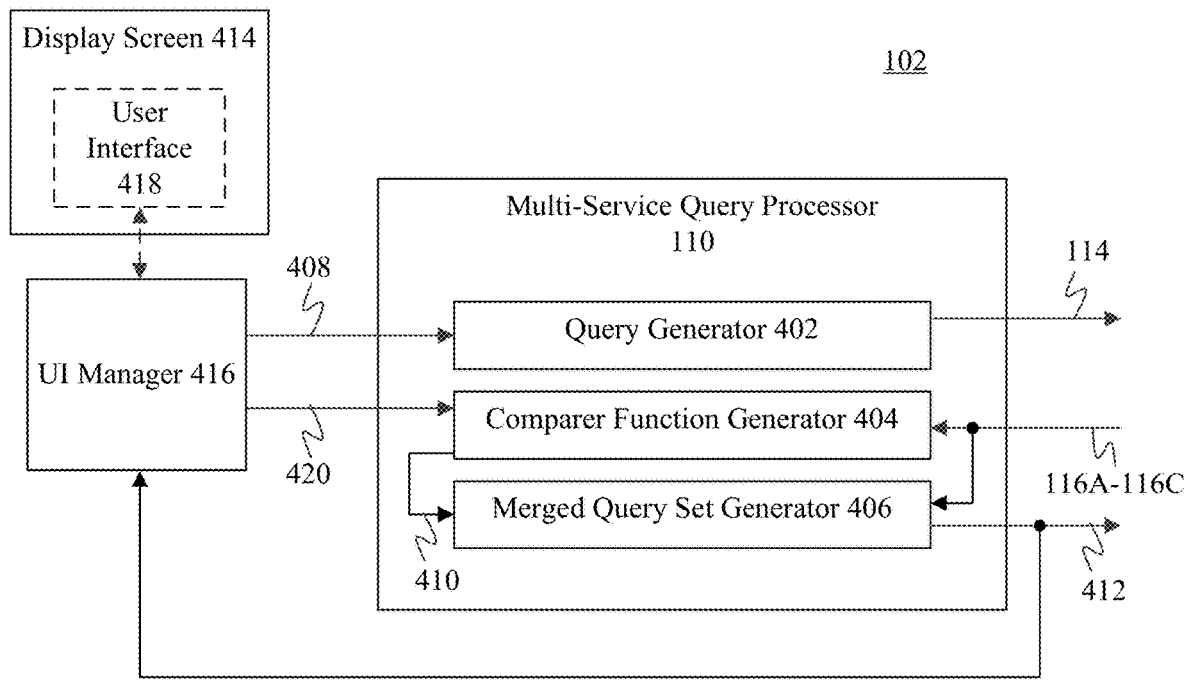
FIG. 4 shows a block diagram of a multi-service query processor implemented in a computing device, according to an example embodiment.

Referring back to FIG. 1, multi-service query processor 110 may be configured in various ways to perform its functions. For instance, FIG. 3 shows a flowchart 300 providing a process for providing a query request to multiple services and merging the query results, according to an example embodiment. Multi-service query processor 110 may operate according to flowchart 300 in an embodiment. Flowchart 300 is described as follows with reference to FIG. 1 and FIG. 4. FIG. 4 shows a block diagram of multi-service query processor 110 implemented in computing device 102, according to an example embodiment. As shown in FIG. 4, computing device 102 includes multi-service query processor 110, a display screen 414, and a UI (user interface) manager 416. Multi-service query processor 110 includes a query generator 402, a comparer function generator 404, and a merged query set generator 406. These features of FIG. 4 are described as follows with reference to flowchart 300.

Flowchart 300 begins with step 302. In step 302, a query is transmitted to a plurality of search services. In FIG. 4, a user may interact with a user interface 418 generated by UI manager 416, and displayed at display screen 414, to generate a query to be transmitted by multi-service query processor 110 to search services such as services 108A-108C at servers 104A-104C. User interface 418 may have any suitable form, including a graphical user interface (GUI) (e.g., a web page, a special purpose GUI, etc.), a textual input interface, etc. For example, user interface 418 may be generated by UI manager 416 to include a query input box and a "send" button, and/or other UI controls to enable queries to be input and executed by a user. Alternatively, multi-service query processor 110 may automatically generate the query.

As shown in FIG. 4, UI manager 416 generates query parameters 408, which includes one or more query terms provided by the user (or automatically generated). Query generator 402 of multi-service query processor 110 receives query parameters 408, and is configured to transmit the contents of query parameter 408 in a query 114 to services 108A-108C and/or other search services. In an embodiment, a user may interact with user interface 418 to designate the search services to receive query 114, the search services to receive query 114 may be pre-configured at multi-service query processor 110, and/or the search services may be determined in another way. A communication interface of computing device 102 may receive and transmit query 114 from computing device 102 according to any suitable communication protocol to the search services indicated by query generator 402.

As shown in the example of FIG. 1, query 114 is transmitted from multi-service query processor 110 at computing device 102 to services 108A-108C at servers 104A-104C, respectively.

Referring back to flowchart 300 of FIG. 3, in step 304, a plurality of query result sets is received from the search services in response to the query. In an embodiment, comparer function generator 404 of FIG. 4 is configured to receive query result sets from the services to which query 114 was directed, such as receiving query result sets 116A-116C from services 108A-108C as shown in FIGS. 1 and 4. As describe elsewhere herein, each service generates a corresponding query result set that includes a list of artifacts (e.g., documents, etc.) that were determined by the service to match the query (e.g., by a string matching algorithm, semantic matching, etc.), and were ranked (e.g., by alphabetical order, by string matching, by a relevance to query 114 determination such as by using a weighting scheme such as TF-IDF (term frequency-inverse document frequency), etc.). Any type of matching and ranking algorithms may be used at each service, and the matching and ranking algorithms used by services may differ greatly from each other in terms of complexity and effectiveness.

In step 306 of flowchart 300, a comparer function is generated by applying a ranking algorithm to the query result sets that orders the query results of the query result sets without regard to a received order of the query results in the query result sets. In embodiment, comparer function generator 404 is configured to generate a comparer function based on the query result sets received from the services receiving query 114, such as query result sets 116A-116C. Comparer function generator 404 applies a ranking algorithm to the query result sets to re-order all of the received query results of the query result sets without respect to the received orders internal to each received query result sets.

In one illustrative example, in response to query 114, the following query result sets A-C shown in Table 5 below may be received from Services A-C, with the provided ranking orders shown:

TABLE 5

| Service | Query Result Set |
|---|---|
| Service A | Doc 110 |
| | Doc 114 |
| | Doc 105 |
| | Doc 108 |
| Service B | Doc 205 |
| | Doc 212 |
| | Doc 225 |
| | Doc 208 |
| Service C | Doc 303 |
| | Doc 364 |
| | Doc 342 |
| | Doc 314 |

In an embodiment, comparer function generator 404 is configured to re-rank all query results of the received query result sets according to a ranking/relevance algorithm that ignores the received ranking orders. Accordingly, in the example of Table 5, comparer function generator 404 is configured to re-rank/re-order the query results received from services A-C based on local knowledge, not knowledge at services A-C.

For instance, comparer function generator 404 may use a ranking function such as TF-IDF to rank, and thereby, re-order the received query result sets. TF-IDF may be used as a text search algorithm to produce a score for each artifact. TF-IDF calculates a score for a document by combining a weight derived from the count of a particular term in a document with the inverse of the count of that term in the overall population (or "corpus") of documents. A TF-IDF value increases proportionally to the number of times a query term appears in an artifact (e.g., a document), but is offset by the frequency of the word in the catalog (e.g., all documents), which helps to adjust for the fact that some words appear more frequently in general. A TF-IDF score for an n-gram (a sequence of n terms) may be calculated according to Equation 1 shown below:

$$TF\text{-}IDF = TF_{w,d} \times IDF_w, \qquad \text{Equation 1}$$

where $TF_{w,d}$ is the term frequency of an n-gram w in artifact d, and $IDF_w$ is the inverse document frequency of the n-gram w across all artifacts in the catalog.

That is, in the example of documents, $TF_{w,d}$ is calculated as the number of times the n-gram w is contained within the document d, and $IDF_w$ is calculated as the total number of documents (by URL or other identifier) divided by the number of documents that contain the n-gram.

Continuing the example of Table 5, Table 6 below shows an example ranking the query results of query result sets A-C by comparer function generator 404 without regard to the received rankings (determined at services A-C):

TABLE 6

| Artifact | Locally Generated Relevance Score |
|---|---|
| Doc 205 | 7.6 |
| Doc 225 | 6.6 |
| Doc 114 | 6.3 |
| Doc 110 | 5.9 |
| Doc 314 | 4.7 |
| Doc 208 | 4.5 |
| Doc 212 | 4.4 |
| Doc 342 | 3.8 |
| Doc 105 | 3.2 |
| Doc 364 | 2.1 |
| Doc 303 | 1.7 |
| Doc 108 | 1.4 |

In this example, Table 6 is the comparer function generated by comparer function generator 404, including the list of artifacts and corresponding relevance scores generated by comparer function generator 404. Various approaches to scoring/ranking can be implemented by comparer function generator 404, in embodiments.

As shown in FIG. 4, comparer function generator 404 generates comparer function 410. Comparer function 410 is an index that is a re-ranking of the received query result sets based on local knowledge (at comparer function generator 404), ignoring the query result rankings performed at the services, and is used in step 308 (flowchart 300 of FIG. 3) to merge the query result sets received from the search services.

A user might wonder why comparer function 410, which is a ranking of received query result sets, is not directly presented to the user as the merged query result ranking. The reason is that comparer function 410 invariably includes a re-shuffled order of the query results from the services, which can lead to a jarring user experience, particularly when subsets of the query result sets may be included and excluded though user actions as further described below. In an embodiment, the merged query result set generated according to step 308 (described below) is a cross-service ranking that still respects the order that was determined by any one service.

One issue with applying the original query to the received query result sets is that the remote services may not agree with the query result in the sense that they may have included artifacts in their query result sets that do not match what local execution of the query would generate. That is to say, given the statistical nature of the matching process, it is possible that services do not completely agree on what "match" means. In any case, in an embodiment, it is not desired to locally override and filter the query result set received from a service, but instead to provide cross-service ordering.

Accordingly, in an embodiment, comparer function generator 404 does not remove artifacts when generating comparer function 410. Artifacts indicated in query result sets 116A-116C are included in comparer function 410, but may be ranked differently. In an embodiment, received artifacts indicated in query result sets 116A-116C that do not match in the ranking algorithm applied by comparer function generator 404 may be assigned the lowest score possible so that they are maintained in comparer function 410. For example, if a result contained documents A, B, C, D and E and the re-querying based scoring performed by comparer function generator 404 determined A's score to be 1.2, B's score to be 0.9, and C's score to be 0.5, and determined no match for D and E, the scores of D and E may be set equal that of C, which is 0.5 (the lowest score generated for a match). In other embodiments, non-matching artifacts may be handled in another manner.

Accordingly, in the calculation of comparer function 410 the combined query results are essentially re-queried in order to obtain a relative ordering for use as comparer function 410. In one embodiment, it may be assumed that every document in the combined results actually matched query 114, however, in other embodiments, some documents may not match query 114. This is because each of the catalog searches at the services acts independently and may use completely different algorithms to determine what is a match and what isn't. For example, in the domain of published software packages, one catalog service may decide to index and match on the package publisher field. However, another catalog service may the package publisher field is not a relevant criterion to determine a search result. However, whatever happens, multi-service query processor 110 avoids dropping out any search results. As described above, one solution is to apply the score of the lowest scoring document of that particular service to any documents from that catalog service that fail to match the local re-query operation. A reason for picking the lowest score recorded for that service is to avoid the situation where all non-matching documents fall all the way to the bottom of the overall results. Duplicating the lowest score simply makes them the least-good match for that particular source. Such behaviors are heuristic in nature and have been determined to be a good fit based upon observing real world data combined in this context.

Referring back to FIG. 3, in step 308 of flowchart 300, the query result sets are merged into a merged query result set using the comparer function. In an embodiment, merged query set generator 406 receives comparer function 410 and query result sets 116A-116C, and is configured to generate a merged query result set 412 based thereon, which may be received by UI manager 416 to be displayed in user interface 418 to a user.

Merged query result set 412 may be generated by merged query set generator 406 according to various techniques. For instance, in an embodiment, merged query set generator 406 may operate according to FIG. 5. FIG. 5 shows a step 502 for merging query results, according to an example embodiment. In step 502, the query result sets are merged into a merged query result set according to the comparer function in a manner that maintains an internal order of each received query result set of the plurality of query result sets in the merged query result set. In an embodiment, merged query set generator 406 may generate merged query result set 412 by aggregating all of the query results of the received query result sets, while maintaining within merged query result set 412 the internal orders of each the received query result sets.

Merged query set generator 406 may generate merged query result set 412 in various ways, including by performing pair-wise compares of query result sets of query result sets, or comparing more than two query result sets at a time. In each case, the highest ranked query results of the query result sets being compared are compared to each other by reference to comparer function 410. Whichever query result has the highest ranking in comparer function 410 is judged to be the highest rank in the compare, and is selected for the next position in merged query result set 412. The query result sets continue to be compared to each other in this manner, removing the highest rank in each compare iteration to be placed in the next position in merged query result set 412, until all available query results have been placed in merged query result set 412. Accordingly, merged query set generator 406 can generate merged query result set 412 after all query result sets have been received from the services, or can generate intermediate versions of merged query result set 412 based on having received a subset of all query result sets having been received.

An example generation of merged query result set 412 is demonstrated as follows with respect to the exemplary first and second query result sets being received from services A and B, as shown in Table 5 above. The first and second query result sets are repeated in Table 7 below:

TABLE 7

| Service | Query Result Set |
| --- | --- |
| Service A | Doc 110 |
|  | Doc 114 |
|  | Doc 105 |
|  | Doc 108 |
| Service B | Doc 205 |
|  | Doc 212 |
|  | Doc 225 |
|  | Doc 208 |

In this example, comparer function generator 404 generated comparer function 410 shown above in Table 6 based on receipt of query result sets from services A-C. Accordingly, merged query set generator 406 may perform the pair-wise compare of the query result sets for services A and B as follows.

During a first iteration, the highest ranked documents of services A and B (according to the rankings performed at services A and B, as shown in Table 7), Doc 110 and Doc 205, are compared by merged query set generator 406, with reference to the comparer function of Table 6. As shown in Table 6, the relevance score of Doc 205 (7.6) is greater than the relevance score of Doc 110 (5.9), and therefore Doc 205 is entered in merged query result set 412 as the highest ranked query result.

During a next iteration, the highest ranked remaining documents of services A and B as shown in Table 7, Doc 110 and Doc 212, are compared by merged query set generator 406, with reference to the comparer function of Table 6. As shown in Table 6, the relevance score of Doc 110 (5.9) is greater than the relevance score of Doc 212 (4.4), and therefore Doc 110 is entered in merged query result set 412 as the next highest ranked query result.

During a next iteration, the highest ranked remaining documents of services A and B as shown in Table 7, Doc 114 and Doc 212, are compared by merged query set generator 406, with reference to the comparer function of Table 6. As shown in Table 6, the relevance score of Doc 114 (6.3) is greater than the relevance score of Doc 212 (4.4), and therefore Doc 114 is entered in merged query result set 412 as the next highest ranked query result.

During a next iteration, the highest ranked remaining documents of services A and B as shown in Table 7, Doc 105 and Doc 212, are compared by merged query set generator 406, with reference to the comparer function of Table 6. As shown in Table 6, the relevance score of Doc 212 (4.4) is greater than the relevance score of Doc 105 (3.2), and therefore Doc 212 is entered in merged query result set 412 as the next highest ranked query result.

During a next iteration, the highest ranked remaining documents of services A and B as shown in Table 7, Doc 105 and Doc 225, are compared by merged query set generator 406, with reference to the comparer function of Table 6. As shown in Table 6, the relevance score of Doc 225 (6.6) is greater than the relevance score of Doc 105 (3.2), and therefore Doc 225 is entered in merged query result set 412 as the next highest ranked query result.

During a next iteration, the highest ranked remaining documents of services A and B as shown in Table 7, Doc 105 and Doc 208, are compared by merged query set generator 406, with reference to the comparer function of Table 6. As shown in Table 6, the relevance score of Doc 208 (4.5) is greater than the relevance score of Doc 105 (3.2), and therefore Doc 208 is entered in merged query result set 412 as the next highest ranked query result.

In this example, all query results of the set provided by Service B have been entered in merged query result set 412, no further comparisons between Service A and B can be made, and thus Docs 105 and 108 of Service A may be entered into merged query result set 412 as the lowest ranked query results, in their order as shown in Table 7.

Accordingly, merged query result set 412 in this example contains the query results shown in the order of Table 8 below:

TABLE 8

Doc 205
Doc 110
Doc 114
Doc 212
Doc 225
Doc 208
Doc 105
Doc 108

As shown in Table 8, the query results of the query result sets of Services A and B have been aggregated/intermixed, but the query results from Service A still retain their ranking order as received from Service A, and the query results from Service B still retain their ranking order as received from Service B.

If one or more further query result sets is/are received, merged query set generator 406 may perform the same process just described with respect to Tables 6 and 7 to aggregate those query result sets into merged query result set 412. For example, to aggregate the query result set of service C shown in Table 5 above into merged query result set 412, merged query set generator 406 may again use the pair-wise merge process, this time comparing the merged query results of Table 8 (containing the merged query results of services A and B) with the query result set of service C shown in Table 5 to generate merged query result set 412 as an aggregation of all of services A-C.

Alternatively, merged query set generator 406 may compare received query result sets in greater numbers than pairs, including in threes, fours, fives, etc. For instance, with respect to the query result sets of services A-C shown above in Table 5, merged query set generator 406 may compare and merge all three query result sets at the same time to generate merged query result set 412 while maintaining the ranking orders generated by the services. For example, in a first iteration, merged query set generator 406 may compare Doc 110 (service A), Doc 205 (service B), and Doc 303 (service C), determining by reference to the comparer function of Table 6 that Doc 205 is highest ranked, and therefore is ranked first in merged query result set 412. In a next iteration, merged query set generator 406 may compare Doc 110 (service A), Doc 212 (service B), and Doc 303 (service C), determining by reference to the comparer function of Table 6 that Doc 110 is highest ranked of the three, and therefore is ranked next highest in merged query result set 412. Tables 5 and 6 may continue to be iterated until merged query result set 412 is generated to contain an aggregation of the query results of all of services A-C, intermixing the query results, while retaining the service-particular rankings.

Accordingly, merged query set generator 406 may generate merged query result set 412 based on all query result sets simultaneously, or may generate merged query result set 412 first based on a subset of all query result sets, generating an intermediate query result set, and further aggregating and merging subsequent query result sets one or more at a time, until the overall merged query result set 412 is generated.

It is noted that query result sets may be received over time, and a user may be presented with intermediate merged query results prior to receiving all query result sets. In such case, comparer function generator 404 generates an intermediate version of comparer function 410 based on the received query result sets that are available, and merged query set generator 406 uses this intermediate comparer function 410 and the available query result sets to generate an intermediate version of merged query result set 412. When subsequent query result sets are received, comparer function generator 404 may generate further intermediate versions of comparer function 410 based on the received query result sets, and the intermediate comparer function 410 may be used by merged query set generator 406 to generate further intermediate versions of merged query result set 412, until all query result sets are received and a final version of merged query result set 412 may be generated.

For instance, FIG. 6 shows a flowchart 600 providing a process for generating an intermediate merged query result set based on receiving query results from a subset of the queried services, according to an example embodiment. Flowchart 600 is described as follows.

Step 602 of flowchart 600 is performed by comparer function generator 404. In step 602, an intermediate comparer function is generated based on a subset of the plurality of query result sets received from the search services while waiting for a remainder of the plurality of query result sets to be received. As described above, query result sets may be received from a subset of the services queried with query 114. Comparer function generator 404 generates an intermediate version of comparer function 410 based on the subset of received query result sets.

In step 604, an intermediate merged query result set is generated by merging the subset of the query result sets using the intermediate comparer function. As described above, merged query set generator 406 uses the intermediate comparer function 410 and the available query result sets to generate an intermediate version of merged query result set 412

Flowchart 600 can be iterated for each subsequent query result set received from a queried service until all query result sets are received and a final merged query result set 412 is generated.

As such, upon completion of flowchart 300 (FIG. 3), merged query result set 412 has been generated. Merged query result set 412 can be displayed to a user of computing device 102 (FIG. 1), and can be interacted with by the user.

For example, as shown in FIG. 4, merged query result set 412 may be received by UI manager 416 to be displayed in user interface 418 to a user. User interface 418 may be generated by UI manager 416 to have any suitable form to enable user interaction and to enable merged query result set 412 to be displayed.

Figure 8:
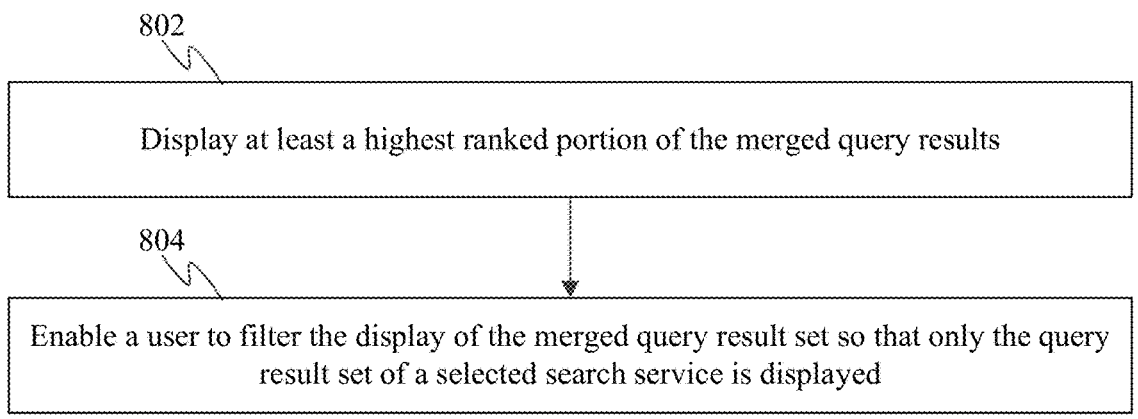
FIG. 8 shows a flowchart providing a process for displaying and filtering merged query results, according to an example embodiment.
Figure 9:
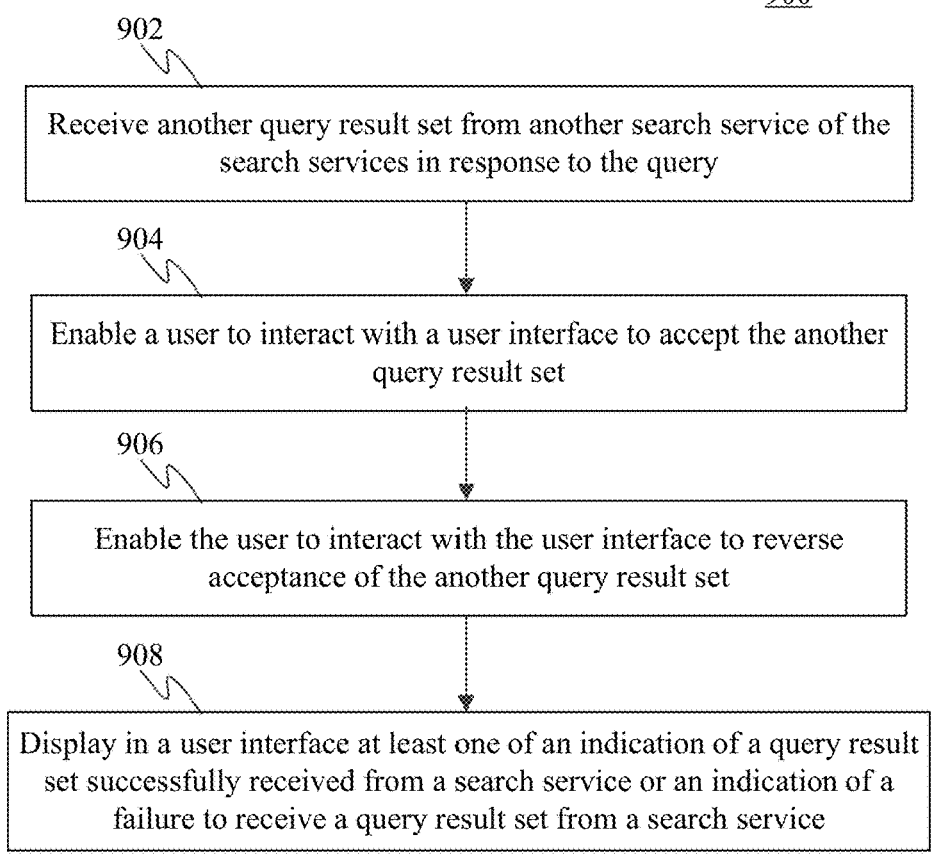
FIG. 9 shows a flowchart providing a process for accepting and rejected received query results and indicating successes and failures in receiving query results, according to an example embodiment.

For instance, FIG. 7 shows a block diagram of user interface 418, according to an example embodiment. As shown in FIG. 7, user interface 414 is displayed in display screen 414. User interface 414 shows merged query result set 702, a filter UI control 704, a query result set acceptor UI control 708, a query result set received indicator 710, and a query result set failure indicator 712. User interface 418 of FIG. 7 is described as follows with respect to FIGS. 8 and 9. FIG. 8 shows a flowchart 800 providing a process for displaying and filtering merged query results, according to an example embodiment. FIG. 9 shows a flowchart 900 providing a process for accepting and rejected received query results and indicating successes and failures in receiving query results, according to an example embodiment. Flowcharts 800 and 900 may be performed by UI manager 416, and are described as follows with respect to FIG. 7.

Flowchart 800 begins with step 802. In step 802, at least a highest ranked portion of the merged query results is displayed. As shown in FIG. 7, merged query result set 702 is displayed in user interface 418. Merged query result set 702 is an example of merged query result set 412, and in embodiments, either includes the entirety of merged query result set 412, or includes a top ranked portion of merged query result set 412 (e.g., a top 5 results, a top 10 results, a top 20 results, etc.). Each query result displayed in merged query result set 702 may be displayed in any manner, including an identifier for the query result, such as a name and/or identification number, a link (e.g., a URL (uniform resource locator) that can be interacted with to download the corresponding artifact, an indication of the service from which the query result was received, etc.

In step 804, a user is enabled to filter the display of the merged query result set so that only the query result set of a selected search service is displayed. In an embodiment, a user may interact with filter UI control 702 (e.g., a button, a check box, a pull down menu, etc.) to filter merged query result set 702. For example, filter UI control 702 may be interacted with to show more or fewer query results of merged query result set 702, and to filter out one or more query result sets received from services. In this manner, the user may limit displayed query results to those sets provided by one or more services, which the user may believe to provide better or more interesting query results, and/or for any other reason. Filtering of the query results may be performed by UI manager 416 in any manner, such as by concealing from display any query results identified as being provided by a particular service the user indicated with filter UI control 702 to be filtered out, etc.

As described above (e.g., with respect to flowchart 600 of FIG. 6), query result sets may be received from services responding to query 114 over time, and in some cases, a service may fail or take a greater amount of time to respond to query 114 (e.g., due to networking issues such as latency, due to server load, due to a failure at the service, timeout, etc.) than other services. As a result, the intermediate merged query result set may be displayed to the user in user interface 418 as merged query result set 702. In this manner, a user is not forced to wait for all query result sets to be received before being displayed at least intermediate results. As query result sets are received and aggregated in to merged query result set 412 (FIG. 4) to generate updated merged query result sets, the user may be enabled to decide whether to accept or reject each received query result set into merged query result set 702. In this manner, the user does not have to watch the results continuously redrawn with newly arriving results merging into view as they arrive, which can be frustrating. Furthermore, failures and successes in responding to query 114 may be indicated to the user in user interface 418. Example embodiments for these features are described with respect to flowchart 900. Note that not all steps of flowchart 900 need be performed in all embodiments.

Flowchart 900 begins with step 902. In step 902, another query result set is received from another search service of the search services in response to the query. As described above, after an intermediate merged query result set 412 (FIG. 4) is generated based on a subset of query result sets (e.g., according to flowchart 600 of FIG. 6), additional query result sets may be received that may be aggregated into merged query result set 412.

In step 904, a user is enabled to interact with a user interface to accept the another query result set. In an embodiment, a received query result set may be indicated in user interface 418 (e.g., by service, by showing the query results of the set), and the user may interact with query result set acceptor UI control 706 (e.g., a button, a check box, a menu, etc.) to indicate the query result set is accepted. Accordingly, the accepted query result set is accumulated into merged query result set 412 and displayed in merged query result set 702. Alternatively, the user may interact with query result set rejector UI control 708 (e.g., a button, a check box, a menu, etc.) to indicate the query result set is rejected. In this manner, the rejected query result set is not integrated into merged query result set 412, and thus not displayed in merged query result set 702. UI manager 408 generates control signal 420 based on the user instruction (filter, accept, reject), which is received by comparer function generator 404 and causes a redetermination of comparer function 410 and merged query result set 412, which can then be received by UI manager 416 and displayed in user interface 418.

In step 906, the user is enabled to interact with the user interface to reverse acceptance of the another query result set. In an embodiment, after an accepted query result set is displayed in merged query result set 702, the user may still be enabled to change their mind by interacting with filter UI control 704 or query result set rejector UI control 708 to filter out or reject the accepted query result set from being included in merged query result set 702.

In step 908, at least one of an indication of a query result set successfully received from a search service or an indication of a failure to receive a query result set from a search service is displayed in a user interface. In embodiments, for each query result set that is successfully received, query result set received indicator 710 may provide a success indication. The success indication may be brief (e.g., in terms of seconds), such as appearing at the time a query result set is received, or may maintain a list of query result sets successfully received. Similarly, for each query result set that fails to be received, query result set failure indicator 712 may provide a failure indication, which may be brief (e.g., in terms of seconds) or may maintain a list of query result sets failed to be received. By making this failure display, the user is aware the displayed merged query result set he/she is viewing is not complete, as it does not contain a merging of all query result sets.

Note the arrangement of user interface 418 shown in FIG. 7 is provided for illustrative purposes, and in other embodiments, the features of user interface 418 may be arranged in other locations, etc., and fewer, additional, and/or alternative controls and indicators may be present.

In embodiments, the user may be presented with a complete merged result, or may be presented with intermediate merged results, depending on the user's preference. For instance, when the first query result set arrives, it may be immediately shown to the user. When a subsequent query result set arrives, as described above, the user may be prompted with an option to "accept and merge" those new results into the view they are currently being displayed. The new query result sets are added into the view, interspersed with the current results. This process repeats until all the results are presented. If the user holds off from hitting the "accept and merge" button, the arriving query result sets can collect in the background. As they arrive they can be immediately merged by multi-service query processor 110, and then, when the user accepts them, the most recently merged query result sets can be displayed.

In an embodiment, multi-service query processor may be configured to allow a small delay on display of the initial query result set, instead merging a group of query result sets that are received before displaying any results to the user. This might delay slightly the initial display of results but would alleviate the need for excessive user interactions in terms of continuously having to "accept and merge" results.

Note that FIG. 4 shows multi-service query processor 110 in computing device 102, where user interface 418 is displayed and interacted with by the user. In another embodiment, multi-service query processor 110 may be implemented in a separate device from computing device 102, such as a proxy service in a server or other device. In such an embodiment, the merge algorithm may execute in the proxy service or other device, and may provide the merged query results as a single catalog.

III. Example Mobile and Stationary Device Embodiments

Computing device 102, servers 104A-104C, services 108A-108C, multi-service query processor 110, software development tool 202, query generator 402, comparer function generator 404, merged query set generator 406, UI manager 416, flowchart 300, step 502, flowchart 600, flowchart 800, and flowchart 900 may be implemented in hardware, or hardware combined with software and/or firmware. For example, services 108A-108C, multi-service query processor 110, software development tool 202, query generator 402, comparer function generator 404, merged query set generator 406, UI manager 416, flowchart 300, step 502, flowchart 600, flowchart 800, and/or flowchart 900 may be implemented as computer program code/instructions configured to be executed in one or more processors and stored in a computer readable storage medium. Alternatively, services 108A-108C, multi-service query processor 110, software development tool 202, query generator 402, comparer function generator 404, merged query set generator 406, UI manager 416, flowchart 300, step 502, flowchart 600, flowchart 800, and/or flowchart 900 may be implemented as hardware logic/electrical circuitry.

For instance, in an embodiment, one or more, in any combination, of services 108A-108C, multi-service query processor 110, software development tool 202, query generator 402, comparer function generator 404, merged query set generator 406, UI manager 416, flowchart 300, step 502, flowchart 600, flowchart 800, and/or flowchart 900 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
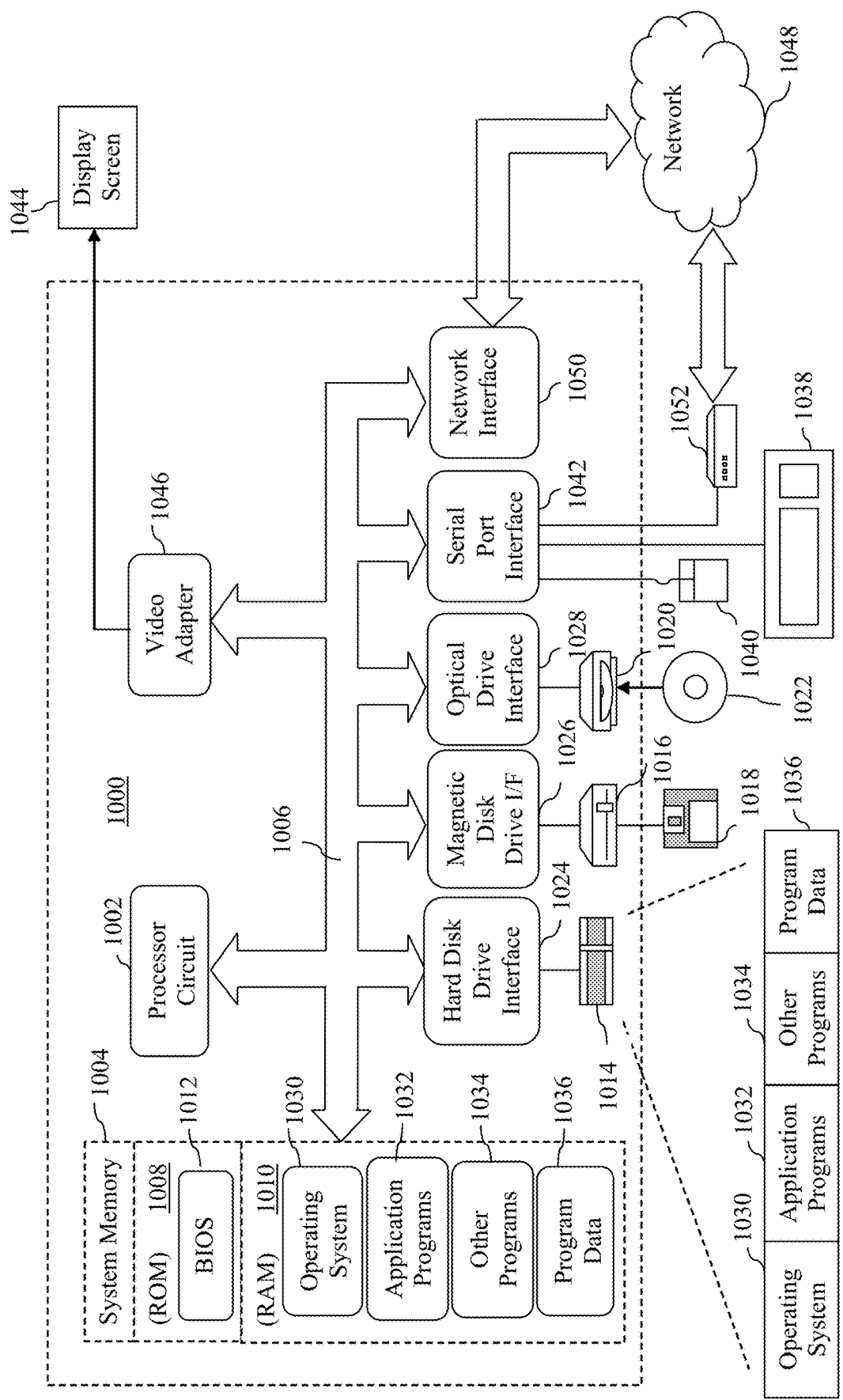
FIG. 10 shows a block diagram of an example computing device that may be used to implement embodiments.

FIG. 10 depicts an exemplary implementation of a computing device 1000 in which embodiments may be implemented. For example, computing device 102 and/or any of servers 104A-104C may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing services 108A-108C, multi-service query processor 110, software development tool 202, query generator 402, comparer function generator 404, merged query set generator 406, UI manager 416, flowchart 300, step 502, flowchart 600, flowchart 800, and/or flowchart 900 (including any suitable step of flowcharts 300, 600, 800, 900), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In an embodiment, a method in a computing device comprises: transmitting a query to a plurality of search services; receiving a plurality of query result sets from the search services in response to the query; generating a comparer function by applying a ranking algorithm to the query result sets that orders the query results of the query result sets without regard to a received order of the query results in the query result sets; and merging the query result sets into a merged query result set using the comparer function.

In an embodiment, the method further comprises: generating the query at a software development tool as a software package query; wherein said receiving comprises: receiving a query result set from each search service that lists one or more software packages available at the search service matching the software package query.

In an embodiment, the generating a comparer function comprises: weighting query results of the plurality of query result sets according to the TF-IDF (term frequency and inverse document frequency) weighting algorithm; and ordering the weighted query results of the query result sets to generate the comparer function.

In an embodiment, the merging comprises: merging the query result sets into a merged query result set according to the comparer function in a manner that maintains an internal order of each received query result set of the plurality of query result sets in the merged query result set.

In an embodiment, the method further comprises: displaying at least a highest ranked portion of the merged query results.

In an embodiment, the method further comprises: enabling a user to filter the display of the merged query result set so that only the query result set of a selected search service is displayed.

In an embodiment, the generating a comparer function comprises: generating an intermediate comparer function based on a subset of the plurality of query result sets received from the search services while waiting for a remainder of the plurality of query result sets to be received; and wherein said merging comprises: generating an intermediate merged query result set by merging the subset of the query result sets using the intermediate comparer function.

In an embodiment, the method further comprises: receiving another query result set from another search service of the search services in response to the query; enabling a user to interact with a user interface to accept the another query result set; generating a second intermediate comparer function by applying the ranking algorithm to the query result sets that orders the query results of the query result sets without regard to a received order of the query results in the query result sets; and generating a second intermediate merged query result set by merging the another query result set and the subset of the query result sets using the intermediate comparer function.

In an embodiment, the method further comprises: enabling the user to interact with the user interface to reverse acceptance of the another query result set.

In an embodiment, the receiving a plurality of query result sets from the search services comprises: displaying in a user interface at least one of an indication of a query result set successfully received from a search service or an indication of a failure to receive a query result set from a search service.

In another embodiment, a computing device comprises: at least one processor circuit; and at least one memory that stores instructions configured to be executed by the at least one processor circuit, the instructions configured to perform operations for querying multiple search services, the operations comprising: transmitting a query to a plurality of search services, receiving a plurality of query result sets from the search services in response to the query, generating a comparer function by applying a ranking algorithm to the query result sets that orders the query results of the query result sets without regard to a received order of the query results in the query result sets, and merging the query result sets into a merged query result set using the comparer function.

In an embodiment, the operations further comprise: generating the query at a software development tool as a software package query; wherein said receiving comprises: receiving a query result set from each search service that lists one or more software packages available at the search service matching the software package query.

In an embodiment, the generating a comparer function comprises: weighting query results of the plurality of query result sets according to the TF-IDF (term frequency and inverse document frequency) weighting algorithm; and ordering the weighted query results of the query result sets to generate the comparer function.

In an embodiment, the merging comprises: merging the query result sets into a merged query result set according to the comparer function in a manner that maintains an internal order of each received query result set of the plurality of query result sets in the merged query result set.

In an embodiment, the operations further comprise: displaying at least a highest ranked portion of the merged query results.

In an embodiment, the operations further comprise: enabling a user to filter the display of the merged query result set so that only the query result set of a selected search service is displayed.

In an embodiment, the generating a comparer function comprises: generating an intermediate comparer function based on a subset of the plurality of query result sets received from the search services while waiting for a remainder of the plurality of query result sets to be received; and wherein said merging comprises: generating an intermediate merged query result set by merging the subset of the query result sets using the intermediate comparer function.

In an embodiment, the operations further comprise: receiving another query result set from another search service of the search services in response to the query; enabling a user to interact with a user interface to accept the another query result set; generating a second intermediate comparer function by applying the ranking algorithm to the query result sets that orders the query results of the query result sets without regard to a received order of the query results in the query result sets; generating a second intermediate merged query result set by merging the another query result set and the subset of the query result sets using the intermediate comparer function; and enabling the user to interact with the user interface to reverse acceptance of the another query result set.

In an embodiment, the receiving a plurality of query result sets from the search services comprises: displaying in a user interface at least one of an indication of a query result set successfully received from a search service or an indication of a failure to receive a query result set from a search service.

In another embodiment, a computing device comprises: a software development tool configured to generate a query to transmit to a plurality of search services; a comparer function generator configured to receive a plurality of query result sets from the search services in response to the query, and to generate a comparer function by applying a ranking algorithm to the query result sets that orders the query results of the query result sets without regard to a received order of the query results in the query result sets; and a merged query set generator configured to merge the query result sets into a merged query result set using the comparer function.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device, comprising:
   transmitting a query to a plurality of search services;
   receiving a plurality of query result sets from two or more, and less than all, of the plurality of search services in response to the query and actively displaying in a user interface a graphical indication of a failure to receive a first query result set, from at least one search service of the plurality of search services, that identifies the first query result set;
   generating a comparer function by applying a ranking algorithm to the plurality of query result sets that orders query results of the plurality of query result sets without regard to a received order of the query results in the plurality of query result sets, including generating an intermediate comparer function based on a subset of the plurality of query result sets received from the search services while waiting for a remainder of the plurality of query result sets to be received;
   merging the plurality of query result sets into a merged query result set based on the comparer function in a manner that maintains an internal order of each received query result set of the plurality of query result sets provided by the search services in the merged query result set, including generating an intermediate merged query result set by merging the subset of the plurality of query result sets based on the intermediate comparer function;
   displaying in the user interface at least a portion of the merged query result set at least partially concurrently with the indication of the failure;
   receiving another query result set, from another search service of the search services and subsequent to said merging the query sets, in response to the query;
   enabling a user to interact with a user interface to accept the another query result set;
   generating a second intermediate comparer function by applying the ranking algorithm to the another query result set that orders other query results of the another query result set without regard to a received order thereof;
   generating a second intermediate merged query result set by merging the another query result set and the subset of the plurality of query result sets based on the second intermediate comparer function; and
   displaying in the user interface at least a portion of the another query result set with the at least a portion of the merged query result set.

2. The method of claim 1, further comprising:
   generating the query at a software development tool as a software package query;
   wherein said receiving the plurality of query result sets comprises:
   receiving a respective query result set from each search service that lists one or more software packages available at the search service matching the software package query.

3. The method of claim 1, wherein said generating a comparer function comprises:
   weighting the query results of the plurality of query result sets according to the TF-IDF (term frequency and inverse document frequency) weighting algorithm; and
   ordering the weighted query results of the plurality of query result sets to generate the comparer function.

4. The method of claim 1, further comprising:
   displaying at least a highest ranked portion of the merged query result set.

5. The method of claim 4, further comprising:
   enabling a user to filter the display of the merged query result set so that only a corresponding query result set of a selected search service is displayed.

6. The method of claim 1, further comprising:
   enabling the user to interact with the user interface to reverse acceptance of the another query result set.

7. The method of claim 1, wherein said receiving the plurality of query result sets comprises:
   displaying in the user interface an indication of at least one query result set successfully received from a responding search service.

8. A computing device, comprising:
   at least one processor circuit; and
   at least one memory that stores instructions configured to be executed by the at least one processor circuit, the instructions configured to perform operations for querying multiple search services, the operations comprising:
   transmitting a query to a plurality of search services,
   receiving a plurality of query result sets from two or more, and less than all, of the plurality of search services in response to the query and actively displaying in a user interface a graphical indication of a failure to receive a first query result set, from at least one search service of the plurality of search services, that identifies the first query result set,
   generating a comparer function by applying a ranking algorithm to the plurality of query result sets that orders query results of the plurality of query result sets without regard to a received order of the query results in the plurality of query result sets, including generating an intermediate comparer function based on a subset of the plurality of query result sets received from the search services while waiting for a remainder of the plurality of query result sets to be received,
   merging the plurality of query result sets into a merged query result set based on the comparer function in a manner that maintains an internal order of each received query result set of the plurality of query result sets provided by the search services in the merged query result set, including generating an intermediate merged query result set by merging the subset of the plurality of query result sets based on the intermediate comparer function,
   displaying in the user interface at least a portion of the merged query result set at least partially concurrently with the graphical indication of the failure,
   receiving another query result set, from another search service of the search services and subsequent to said merging the query sets, in response to the query,
   enabling a user to interact with the user interface to accept the another query result set,
   generating a second intermediate comparer function by applying the ranking algorithm to the another query result set that orders other query results of the another query result set without regard to a received order thereof;
   generating a second intermediate merged query result set by merging the another query result set and the subset of the plurality of query result sets based on the second intermediate comparer function; and displaying in the user interface at least a portion of the another query result set with the at least a portion of the merged query result set.

9. The computing device of claim 8, wherein the operations further comprise:

generating the query at a software development tool as a software package query;

wherein said receiving the plurality of query result sets comprises:

receiving a respective query result set from each search service that lists one or more software packages available at the search service matching the software package query.

10. The computing device of claim 8, wherein said generating a comparer function comprises:

weighting the query results of the plurality of query result sets according to the TF-IDF (term frequency and inverse document frequency) weighting algorithm; and ordering the weighted query results of the plurality of query result sets to generate the comparer function.

11. The computing device of claim 8, wherein the operations further comprise:

displaying at least a highest ranked portion of the merged query result set.

12. The computing device of claim 11, wherein the operations further comprise:

enabling a user to filter the display of the merged query result set so that only a corresponding query result set of a selected search service is displayed.

13. The computing device of claim 8, wherein said receiving the plurality of query result sets comprises:

displaying in the user interface an indication of at least one query result set successfully received from a responding search service.

14. A physical, hardware-based computer-readable storage medium having program instructions recorded thereon that, when executed by at least one processor circuit, perform a method, the method comprising:

generating a query to transmit to a plurality of search services;

receiving a plurality of query result sets from two or more, and less than all, of the plurality of search services in response to the query, and generating a comparer function by applying a ranking algorithm to the plurality of query result sets that orders query results of the plurality of query result sets without regard to a received order of the query results in the plurality of query result sets, said generating a comparer function including generating an intermediate comparer function based on a subset of the plurality of query result sets received from the search services while waiting for a remainder of the plurality of query result sets to be received;

actively displaying by a user interface a graphical indication of a failure to receive a first query result set, from at least one search service of the plurality of search services, that identifies the first query result set;

merging the plurality of query result sets into a merged query result set based on the comparer function in a manner that maintains an internal order of each received query result set of the plurality of query result sets provided by the search services in the merged query result set, including generating an intermediate merged query result set by merging the subset of the plurality of query result sets based on the intermediate comparer function;

displaying in the user interface at least a portion of the merged query result set at least partially concurrently with the graphical indication of the failure;

receiving another query result set, from another search service of the search services and subsequent to said merging the query sets, in response to the query;

enabling a user to interact with a user interface to accept the another query result set;

generating a second intermediate comparer function by applying the ranking algorithm to the another query result set that orders other query results of the another query result set without regard to a received order thereof;

generating a second intermediate merged query result set by merging the another query result set and the subset of the plurality of query result sets based on the second intermediate comparer function; and displaying in the user interface at least a portion of the another query result set with the at least a portion of the merged query result set.

15. The computer-readable storage medium of claim 14, wherein the method comprises:

generating the query as a software package query;

wherein each of the plurality of query result sets lists one or more software packages available at its respective search service matching the software package query.

16. The computer-readable storage medium of claim 14, wherein the method further comprises:

weighting the query results of the plurality of query result sets according to the TF-IDF (term frequency and inverse document frequency) weighting algorithm; and ordering the weighted query results of the plurality of query result sets in generating the comparer function.

17. The computer-readable storage medium of claim 14, wherein the method further comprises:

displaying at least a highest ranked portion of the merged query result set.

18. The computer-readable storage medium of claim 17, wherein the method further comprises:

enabling a user to filter the display of the merged query result set so that only a corresponding query result set of a selected search service is displayed.

19. The computer-readable storage medium of claim 14, wherein the method further comprises:

enabling the user to interact with the user interface to reverse acceptance of the another query result set.

20. The computer-readable storage medium of claim 14, wherein said receiving the plurality of query result sets comprises:

displaying in the user interface an indication of at least one query result set successfully received from a responding search service.

* * * * *